United States Patent
Kim et al.

(10) Patent No.: US 10,327,250 B2
(45) Date of Patent: Jun. 18, 2019

(54) METHOD FOR SUPPORTING FLEXIBLE RESOURCE ALLOCATION IN WIRELESS COMMUNICATION SYSTEM, AND APPARATUS THEREFOR

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Suhwook Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 15/514,781

(22) PCT Filed: Sep. 25, 2015

(86) PCT No.: PCT/KR2015/010223
§ 371 (c)(1),
(2) Date: Mar. 27, 2017

(87) PCT Pub. No.: WO2016/048098
PCT Pub. Date: Mar. 31, 2016

(65) Prior Publication Data
US 2017/0223693 A1    Aug. 3, 2017

Related U.S. Application Data

(60) Provisional application No. 62/056,597, filed on Sep. 28, 2014, provisional application No. 62/106,736, (Continued)

(51) Int. Cl.
| | |
|---|---|
| *H04L 5/00* | (2006.01) |
| *H04L 27/26* | (2006.01) |
| *H04W 72/04* | (2009.01) |
| *H04W 84/12* | (2009.01) |

(Continued)

(52) U.S. Cl.
CPC ......... *H04W 72/048* (2013.01); *H04L 5/0041* (2013.01); *H04L 5/0053* (2013.01);
(Continued)

(58) Field of Classification Search
CPC ..... H04L 27/26; H04L 5/0091; H04L 5/0041; H04L 5/0053; H04W 72/0413; H04W 72/0453
See application file for complete search history.

(56) References Cited

U.S. PATENT DOCUMENTS

| | | | |
|---|---|---|---|
| 2011/0222490 A1 | 9/2011 | Fischer et al. | |
| 2012/0281774 A1* | 11/2012 | Lee | H04B 7/0452 375/260 |

(Continued)

FOREIGN PATENT DOCUMENTS

| | | |
|---|---|---|
| EP | 2765729 | 8/2014 |
| JP | 2011182391 | 9/2011 |

(Continued)

OTHER PUBLICATIONS

European Patent Office Application Serial No. 15844801.9, Search Report dated Apr. 26, 2018, 6 pages.

(Continued)

*Primary Examiner* — Redentor Pasia
(74) *Attorney, Agent, or Firm* — Lee Hong Degerman Kang & Waimey

(57) ABSTRACT

The present document relates to a wireless communication system and, more specifically, to a method for flexibly supporting resource allocation in a wireless LAN system, and a method and an apparatus for signal transmission using the same. To this end, a first STA configures a radio frame comprising: a signaling (SIG) field including control information; and a data field in which data can be transmitted via a discontinuous channel or a channel having a bandwidth (Continued)

size that is supported by a legacy system. When the first STA transmits the configured radio frame to a second STA, the SIG field preferably comprises: information about a full bandwidth in which data can be transmitted via the data field; and null indicator information indicating a channel region of the full bandwidth that is not used in data transmission, or used channel indicator information indicating a channel region of the full bandwidth that is used in data transmission.

15 Claims, 15 Drawing Sheets

Related U.S. Application Data filed on Jan. 23, 2015, provisional application No. 62/126,710, filed on Mar. 1, 2015, provisional application No. 62/200,123, filed on Aug. 3, 2015.

(52) U.S. Cl.
CPC ............ *H04L 5/0091* (2013.01); *H04L 27/26* (2013.01); *H04W 72/0413* (2013.01); *H04W 72/0453* (2013.01); *H04L 5/0007* (2013.01); *H04W 84/12* (2013.01)

(56) References Cited

U.S. PATENT DOCUMENTS

| | | | |
|---|---|---|---|
| 2012/0287915 A1 | 11/2012 | Cheong et al. | |
| 2012/0327915 A1 | 12/2012 | Kang et al. | |
| 2013/0148625 A1 | 6/2013 | Kim et al. | |
| 2014/0079016 A1 | 3/2014 | Dai et al. | |
| 2014/0161079 A1 | 6/2014 | Noh et al. | |
| 2015/0139119 A1* | 5/2015 | Azizi | H04W 72/1278 370/329 |
| 2015/0296454 A1* | 10/2015 | Lee | H04W 52/0209 370/311 |
| 2016/0087766 A1* | 3/2016 | Sun | H04L 5/0007 370/329 |

FOREIGN PATENT DOCUMENTS

| | | |
|---|---|---|
| JP | 2014511651 | 5/2014 |
| KR | 1020120093320 | 8/2012 |
| KR | 1020130133273 | 12/2013 |

OTHER PUBLICATIONS

PCT International Application No. PCT/KR2015/010223, Written Opinion of the International Searching Authority dated Feb. 19, 2016, 22 pages.

Zhang, H. et al., "Spec Text on Bandwidth Field in HE-SIG-A of HE-MU Format", IEEE P802.11 Wireless LANs, doc.: IEEE 802.11-16/0899r0, Jul. 2016, 4 pages.

Wang, H. et al., "PHY SIG Frame Structure for IEEE 802.11aj (45GHz)", doc.: IEEE 802.11-14/0883r2, Sep. 2014, 21 pages.

European Patent Office Application No. 15844801.9, Search Report dated Apr. 26, 2018, 6 pages.

* cited by examiner

Fig. 8

METHOD FOR SUPPORTING FLEXIBLE RESOURCE ALLOCATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2015/010223, filed on Sep. 25, 2015, which claims the benefit of U.S. Provisional Application Nos. 62/056,597, filed on Sep. 28, 2014, 62/106,736, filed on Jan. 23, 2015, 62/126,710, filed on Mar. 1, 2015 and 62/200,123, filed on Aug. 3, 2015, the contents of which are all hereby incorporated by reference herein in their entirety.

TECHNICAL FIELD

The present disclosure relates to a wireless communication system, and more particularly, to a method and apparatus for enabling efficient data transmission on a non-contiguous channel or a channel having a bandwidth that is not supported by a legacy system in a wireless local area network (WLAN) system.

BACKGROUND ART

While the proposed method is applicable to various types of wireless communication, a WLAN system will be described as an exemplary system to which the present disclosure is applicable.

WLAN Standards have been developed as institute of electrical and electronics engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying orthogonal frequency division multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present disclosure is to provide a method and apparatus for efficiently transmitting a signal by a station (STA) in a wireless communication system.

Specifically, the present disclosure is intended to efficiently define a resource allocation scheme for orthogonal frequency division multiple access (OFDMA) or multi-user multiple input multiple output (MU-MIMO) in a future-generation WLAN system conforming to institute of electrical and electronics engineers (IEEE) 802.11ax among wireless communication systems.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for transmitting a signal by a station (STA) in a wireless local area network (WLAN) system includes configuring a radio frame including a signaling (SIG) field and a data field by a first STA, the SIG field including control information and the data field capable of carrying data on a non-contiguous channel or a channel having a bandwidth not supported by a legacy system, and transmitting the configured radio frame to a second STA by the first STA. The SIG field includes information about a total bandwidth for data transmission in the data field, and null indication information indicating a channel area not used for data transmission in the total bandwidth or used channel indication information indicating a channel area used for data transmission in the total bandwidth.

In another aspect of the present invention, an STA in a WLAN system includes a processor configured to configure a radio frame including a SIG field and a data field, the SIG field including control information and the data field capable of carrying data on a non-contiguous channel or a channel having a bandwidth not supported by a legacy system, and a transceiver configured to transmit the configured radio frame to a second STA. The processor is configured to include, in the SIG field, information about a total bandwidth for data transmission in the data field, and null indication information indicating a channel area not used for data transmission in the total bandwidth or used channel indication information indicating a channel area used for data transmission in the total bandwidth.

The null indication information or the used channel indication information may be a bitmap, and each bit of the bitmap may correspond to a unit channel area of a predetermined size in the total bandwidth.

The total bandwidth may include a primary channel and a secondary channel, and each bit of the bitmap representing the null indication information or the used channel indication information may correspond to a channel other than the primary channel.

The null indication information or the used channel indication information may be an index indicating one of predetermined channel combinations, each forming a non-contiguous channel used for data transmission or a channel having a bandwidth not supported by the legacy system.

If the total bandwidth is equal to or larger than 80 MHz, the null indication information or the used channel indication information may be included.

If the total bandwidth is 80 MHz, the channel of the bandwidth not supported by the legacy system may be a 40-MHz channel or a 60-MHz channel, and if the total bandwidth is 160 MHz, the channel of the bandwidth not supported by the legacy system may be a 40-MHz channel, a 80-MHz channel, a 100-MHz channel or a 140-MHz channel.

The SIG field may include a first SIG field (SIG A) and a second SIG field (SIG B), the information about the total bandwidth may be included in the first SIG field, and the null indication information or the used channel indication information may be included in one of the first SIG field and the second SIG field.

One of the first SIG field and the second SIG field may further include a null indication presence/absence information field indicating whether the null indication information is included, or a used channel indication presence/absence information field indicating whether the used channel indication information is included.

Advantageous Effects

According to the present disclosure, a station (STA) can efficiently transmit a signal in a wireless communication system. Specifically, a resource allocation scheme can be performed efficiently for orthogonal frequency division multiple access (OFDMA) or multi-user multiple input multiple output (MU-MIMO) in a future-generation wireless local area network (WLAN) system conforming to institute of electrical and electronics engineers (IEEE) 802.11ax among wireless communication systems.

It will be appreciated by persons skilled in the art that the effects that could be achieved with the present disclosure are not limited to what has been particularly described hereinabove and the above and other effects that the present disclosure could achieve will be more clearly understood from the following detailed description.

DESCRIPTION OF DRAWINGS

FIGS. 4 to 8 are views illustrating exemplary frame structures in an institute of electrical and electronics engineers (IEEE) 802.11 system.

BEST MODE

Figure 1:
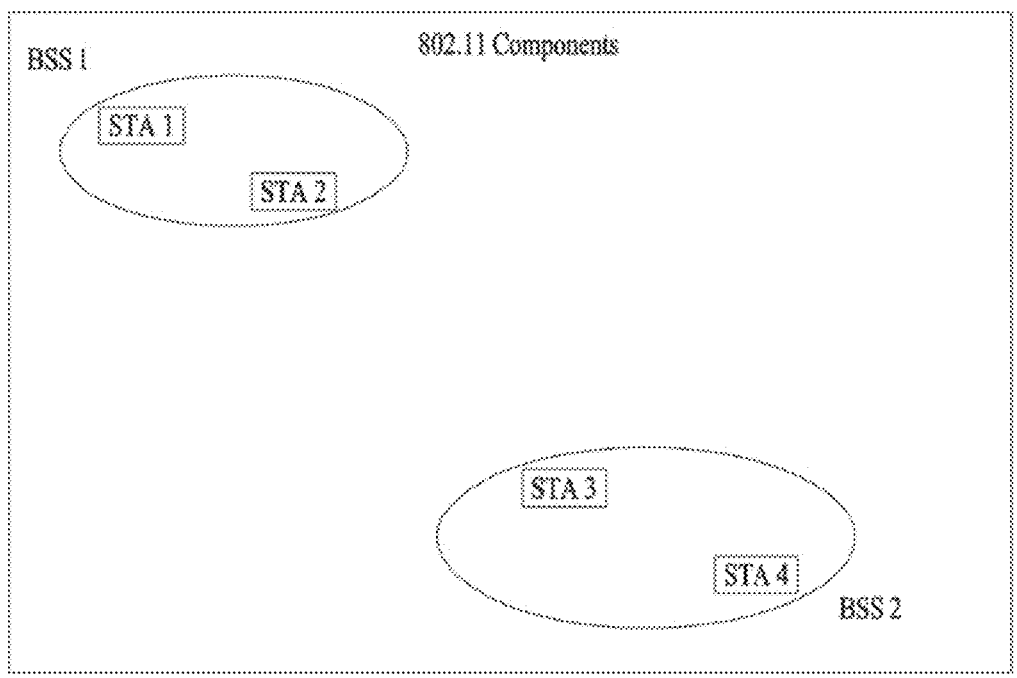
FIG. 1 is a view illustrating an exemplary configuration of a Wireless Local Area Network (WLAN) system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

In the present disclosure, a terminology, each of which includes such an ordinal number as 1st, 2nd and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as 'unit', . . . part' corresponds to a unit for processing at least one or more functions or operations. The unit can be implemented by a combination of hardware and/or software.

FIG. 1 is a view illustrating an exemplary configuration of a Wireless Local Area Network (WLAN) system.

As depicted in FIG. 1, a wireless local area network includes at least one Basic Service Set (BSS). The BSS is a set of Stations (STA) capable of communicating with each other by successfully performing synchronization.

The STA is a logical entity including a physical layer interface for a Medium Access Control (MAC) and wireless media. The STA includes an Access Point (AP) and a Non-AP STA. A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a Distribution System (DS) via the wireless media. The AP can be called a concentrated controller, a Base Station (BS), a Node-B, a Base Transceiver System (BTS), a site controller, or the like.

The BSS can be divided into an infrastructure BSS and an Independent BSS (IBSS).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
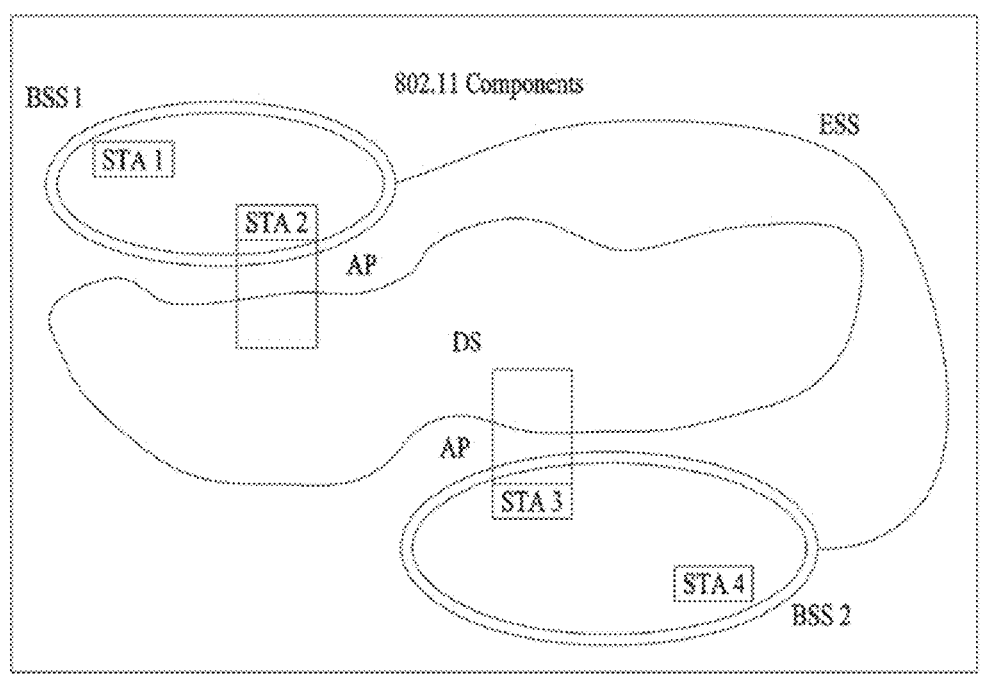
FIG. 2 is a view illustrating another exemplary configuration of a WLAN system.

FIG. 2 is a view illustrating another exemplary configuration of a WLAN system.

The BSS depicted in FIG. 2 corresponds to the infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

Figure 3:
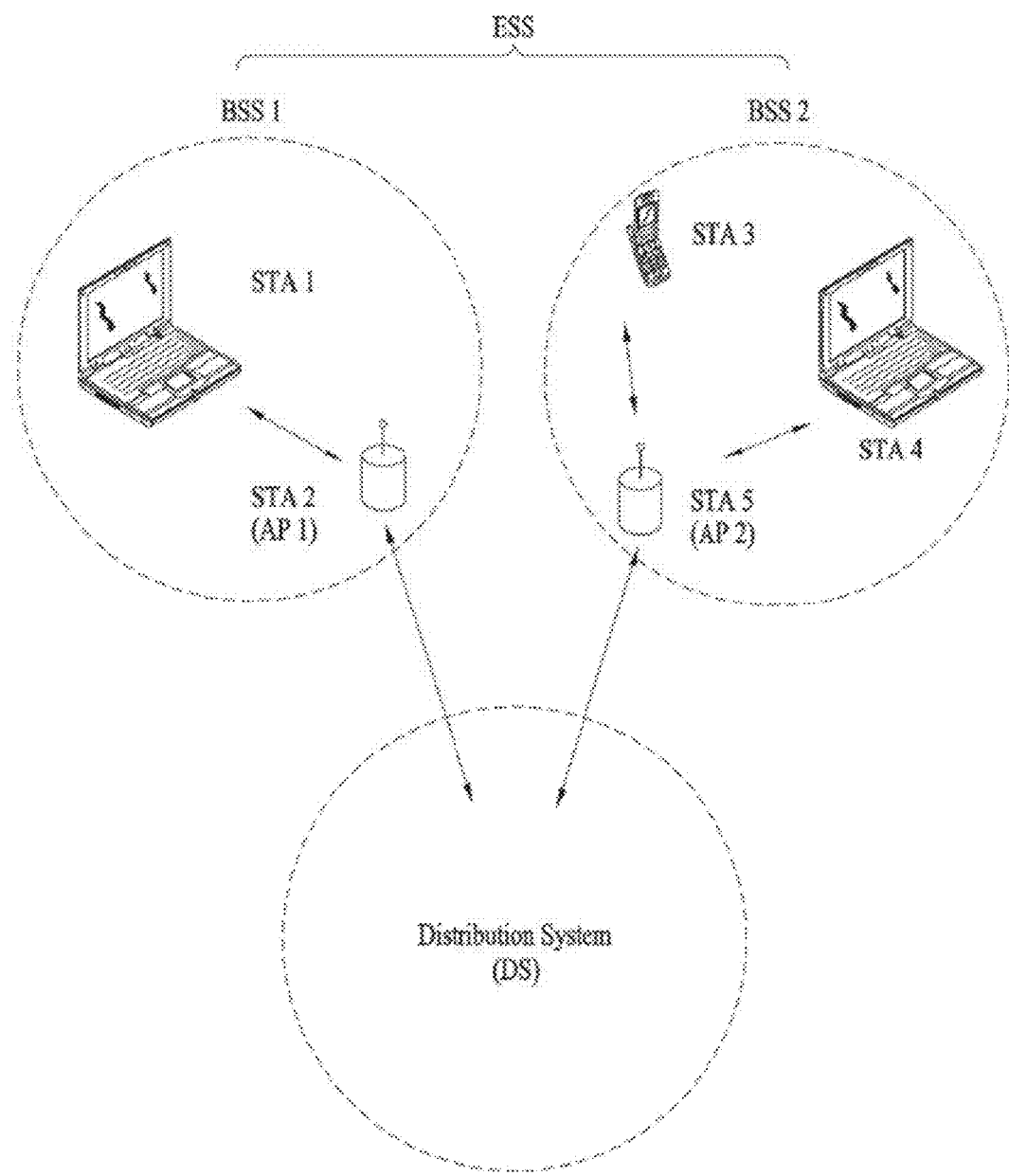
FIG. 3 is a view illustrating an exemplary structure of a WLAN system.
Figure 4:
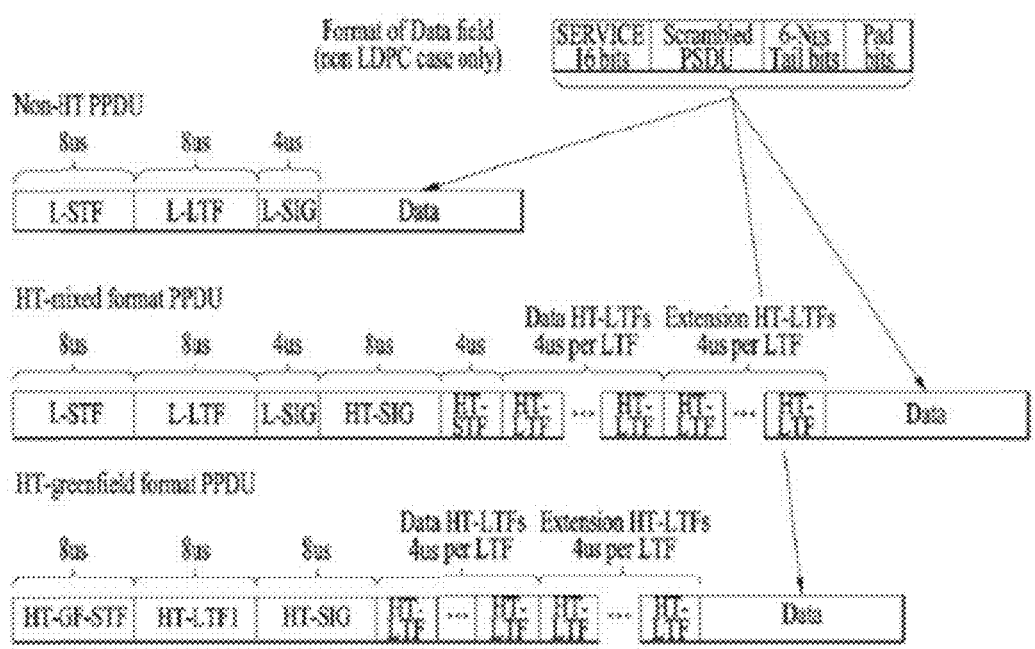

FIG. 3 is a view illustrating an exemplary structure of a WLAN system. In FIG. 3, an example of an infrastructure BSS including a DS is described.

Referring to an example of FIG. 3, ESS includes a BSS1 and BSS2. In a WLAN system, a station corresponds to a device operating according to MAC/PHY regulation of IEEE 802.11. A station includes an AP station and a non-AP station. In general, the non-AP station corresponds to such a device directly handled by a user as a laptop computer, a mobile phone, and the like. In the example of FIG. 3, a station 1, a station 3, and a station 4 correspond to the non-AP station and a station 2 and a station 5 correspond to the AP station.

In the following description, the non-AP station may be referred to as a terminal, a Wireless Transmit/Receive Unit (WTRU), a User Equipment (UE), a Mobile Station (MS), a mobile terminal, a Mobile Subscriber Station (MSS), and the like. And, the AP corresponds to a Base Station (BS), a Node-B, an evolved Node-B (eNB), a Base Transceiver System (BTS), a femto BS, and the like.

FIGS. 4 to 8 illustrate exemplary frame structures used in an Institute of Electrical and Electronics Engineers (IEEE) 802.11 system.

An STA may receive a PLCP Protocol Data Unit (PPDU). A PPDU frame may be formatted to include a Short Training Field (STF), a Long Training Field (LTF), a SIGNAL (SIG) field, and a Data field. For example, a PPDU frame format may be configured based on the type of the PPDU frame format.

For example, a non-High Throughput (non-HT) PPDU format may include only a Legacy-STF (L-STF), a Legacy-LTF (L-LTF), a SIG field, and a Data field.

The PPDU frame format type may be configured to be one of a HT-mixed format PPDU and an HT-greenfield format PPDU. The above-described PPDU format may further include an additional STF (or an STF of a different type), an additional LTF (or an LTF of a different type), and an additional SIG field (or a SIG field of a different type) between the SIG field and the Data field.

Figure 5:
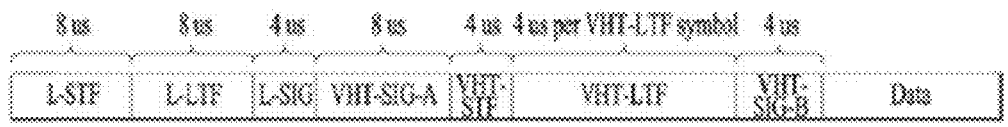

Referring to FIG. 5, a Very High Throughput (VHT) PPDU format may be configured. The VHT PPDU format may also include an additional STF (or an STF of a different type), an additional LTF (or an LTF of a different type), and an additional SIG field (or a SIG field of a different type) between the SIG field and the Data field. More specifically, at least one of a VHT-SIG-A field, a VHT-STF, a VHT-LTF, and a VHT SIG-B field may further be included between an L-SIG field and the Data field in the VHT PPDU format.

An STF may be a signal used for Automatic Gain Control (AGC), diversity selection, accurate time synchronization, etc. The STF and the LTF may be collectively referred to as a Physical Layer Convergence Protocol (PLCP) preamble, and the PLCP preamble may be a signal used for synchronization and channel estimation of an OFDM physical layer.

Figure 6:
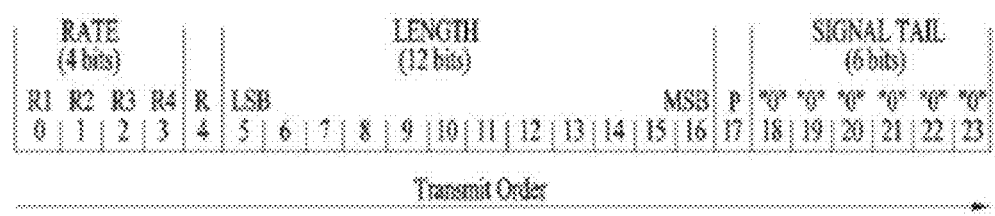

Referring to FIG. 6, the SIG field may include a RATE field and a LENGTH field. The RATE field may include information about modulation and a coding rate of data. The LENGTH field may include information about the length of the data. Additionally, the SIG field may include parity bits, and SIG Tail bits.

The Data field may include a SERVICE field, a PLCP Service DATA Unit (PSDU), and PPDU TAIL bits. When needed, the Data field may also include padding bits.

Figure 7:
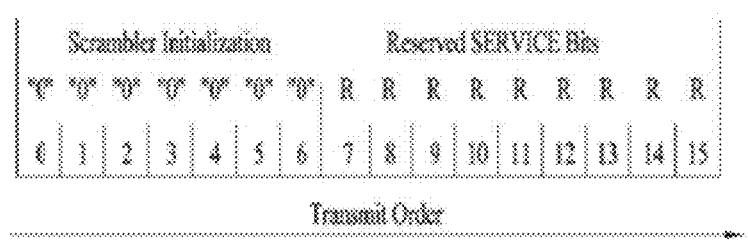

Referring to FIG. 7, a part of bits of the SERVICE field may be used for synchronization of a descrambler in a receiver, and another part of the bits of the SERVICE field may be reserved. The PSDU may correspond to a MAC Protocol Data Unit (PDU) defined at the MAC layer and include data generated/used by a higher layer. The PPDU TAIL bits may be used to return an encoder to a zero state. The padding bits may be used to match the length of the Data field to a predetermined unit.

As described before, for example, the VHT PPDU format may include an additional STF (or an STF of a different type), an additional LTF (or an LTF of a different type), and an additional SIG field (or a SIG field of a different type). The L-STF, the L-LTF, and the L-SIG may be a part for non-VHT in the VHT PPDU, and the VHT-SIG-A, the VHT-STF, the VHT-LTF, and the VHT-SIG-B may be a part for VHT. In other words, an area for non-VHT fields and an area for VHT fields may be separately defined in the VHT PPDU. For example, the VHT-SIG-A may include information for interpreting the VHT PPDU.

Figure 8:
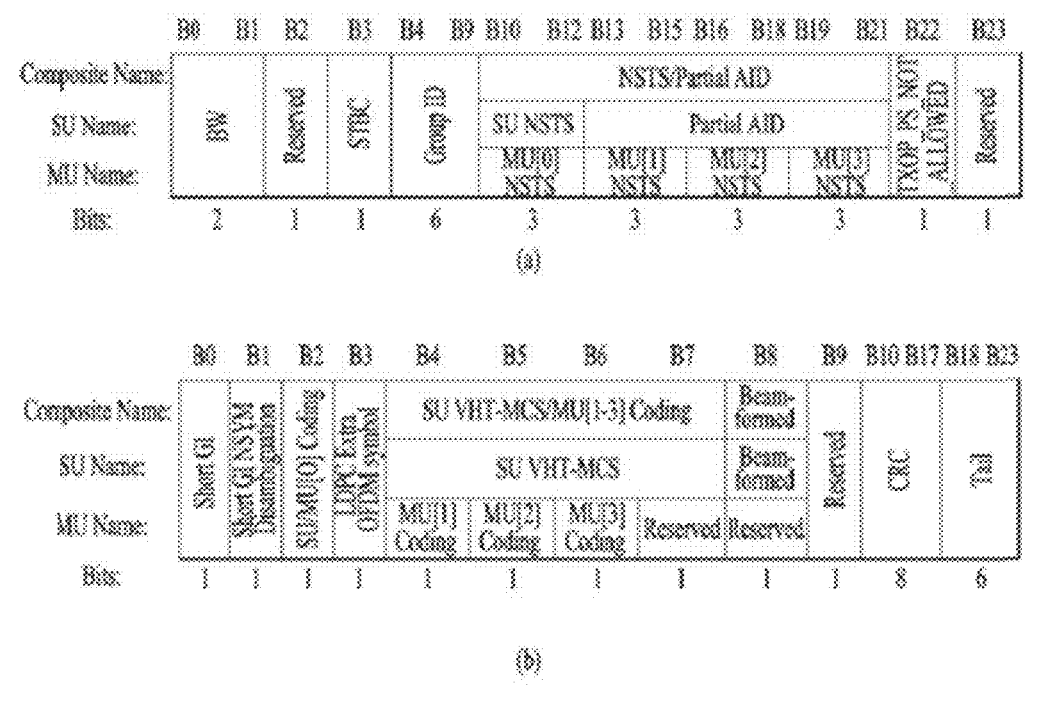

Referring to FIG. 8, for example, the VHT-SIG-A may include VHT SIG-A1 (FIG. 8(a)) and VHT SIG-A2 (FIG. 8(b)). Each of the VHT SIG-A1 and the VHT SIG-A2 may have 24 data bits, and the VHT-SIG A1 may precede the VHT-SIG A2. The VHT-SIG-A1 may include a Bandwidth (BW) field, a Space Time Block Coding (STBC) field, a Group Identifier (ID) field, a Number of Space-Time Streams (NSTS)/Partial Association ID (Partial AID) field, a TXOP_PS_NOT_ALLOWED field, and a Reserved field. The VHT SIG-A2 may include a Short Guard Interval (GI) field, a Short GI NSYM Disambiguation field, a Single User (SU)/Multi-User (MU)[0] Coding field, a Low Density Parity Check (LDPC) Extra OFDM Symbol field, an SU VHT-Modulation Coding Scheme (MCS)/MU[1-3] Coding field, a Beamformed field, a Cyclic Redundancy Check (CRC), a Tail, and a Reserved field. Information about the VHT PPDU may be acquired from the VHT SIG-A1 and the VHT SIG-A2.

Figure 9:
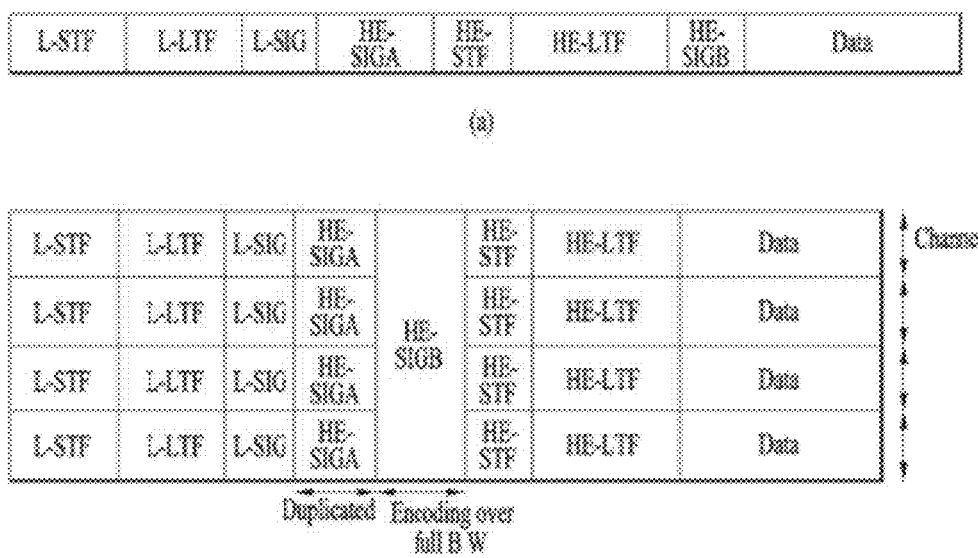
FIG. 9 is a view illustrating exemplary physical layer protocol data unit (PPDU) formats that may be used in the present disclosure.

FIG. 9 is a view illustrating exemplary physical layer protocol data unit (PPDU) formats that may be used in the present disclosure.

As described before, various PPDU formats are available. For example, a new PPDU format may be provided. A PPDU may include L-STF, L-LTF, L-SIG, and DATA fields. For example, the PPDU frame may further include HE-SIG A, HE-STF, HE-LTF, and HE-SIG B fields. The HE-SIG A field may include, for example, common information. For example, the common information may include Bandwidth, Guard Interval (GI), Length, BSS Color, and so on. For example, an L part (L-STF, L-LTF, and L-SIG) may be transmitted in a Single Frequency Network (SFN) mode on a 20-MHz basis in the frequency domain. For example, like the L part, the HE-SIG A field may be transmitted in the SFN mode on a 20-MHz basis. For example, if a channel has a bandwidth larger than 20 MHz, the L part and the HE-SIG A field may be duplicated on a 20-MHz basis and then transmitted. The HE SIG-B field may provide user-specific information. For example, the user-specific information may include an STA AID, resource allocation information (e.g., an allocation size), an MCS, $N_{sts}$, coding, STBC, TXBF, and so on. Further, the HE SIG-B field may be transmitted across a total bandwidth.

For example, referring to (b) of FIG. 9, a PPDU may be transmitted in an 80-MHz band. The L part and the HE-SIG A field may be duplicated on a 20-MHz basis and then transmitted, and the HE-SIG B field may be transmitted across the total 80-MHz band. However, the transmission scheme may be purely exemplary, not limited to the above embodiment.

Figure 10:
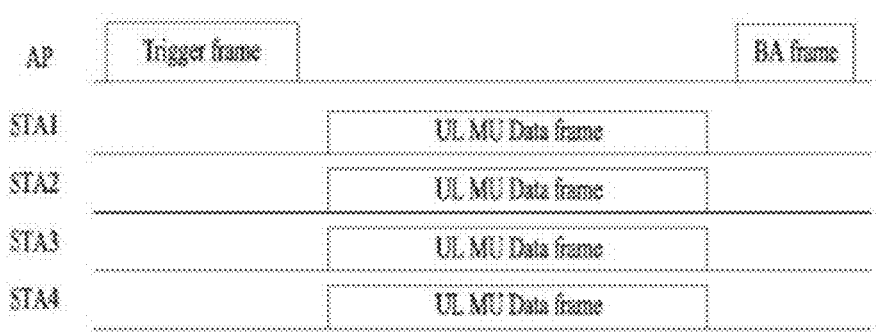
FIG. 10 is a view illustrating uplink multi-user (UL MU) transmission applicable to the present disclosure.

FIG. 10 is a view illustrating uplink multi-user (UL MU) transmission applicable to the present disclosure.

As described above, the AP may acquire a TXOP to access a medium, and transmit a signal by occupying the medium through contention. Referring to FIG. 10, the AP STA may transmit a trigger frame to a plurality of STAs to perform UL MU transmission. In this case, the trigger frame may include, for example, information about a resource allocation position and size, IDs of the STAs, MCS, and MU type (=MIMO, OFDMA) as UL MU allocation information. That is, the trigger frame transmitted by the AP STA to the plurality of STAs may be a frame allowing the plurality of STAs to perform UL data transmissions.

The plurality of STAs may transmit data to the AP after an SIFS elapses based on a format indicated by the trigger frame. The AP may then send ACK/NACK information to the STAs, and thus the STAs may perform UL MU transmissions.

Figure 11:
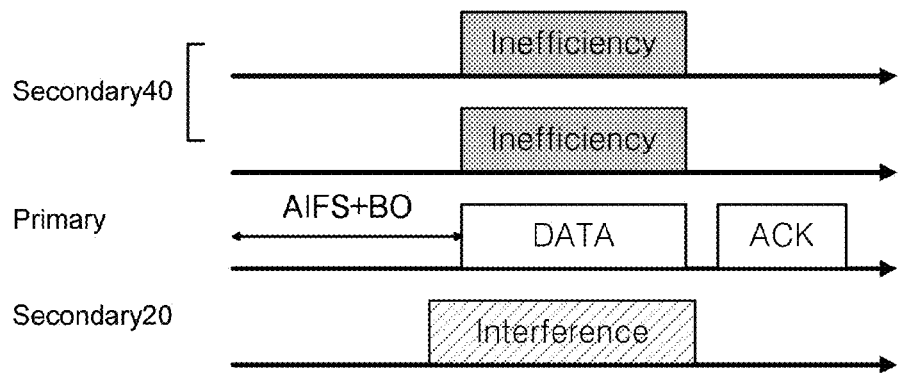
FIGS. 11 and 12 are views illustrating inefficiency of a legacy channel allocation scheme.
Figure 12:
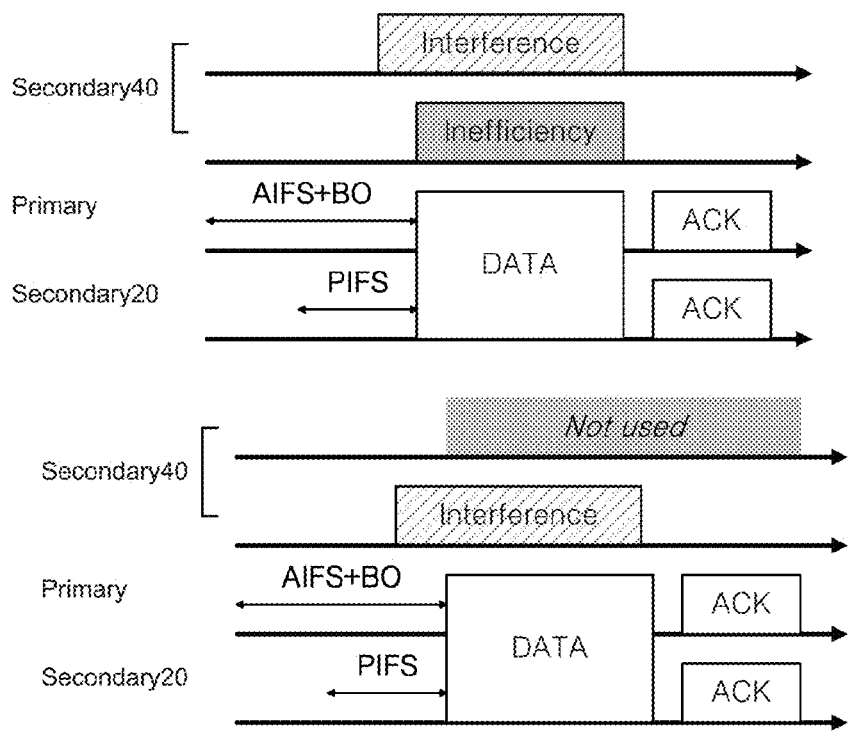

FIGS. 11 and 12 are views illustrating inefficiency of a legacy channel allocation scheme.

Referring to FIGS. 11 and 12, only when a contiguous channel including a primary channel is idle, a legacy VHT STA uses the contiguous channel. Specifically, FIG. 11 illustrates data transmission on a 20-MHz primary channel, when the primary channel is idle for a predetermined time, and FIG. 12 illustrates data transmission on a 40-MHz channel being a combination of a primary channel and a 20-MHz secondary channel, Secondary 20, when the primary channel and the 20-MHz secondary channel, Secondary 20 contiguous to the primary channel are idle for a predetermined time.

However, if channels are used in the above manner, another secondary channel, Secondary 40 is not used, thereby causing inefficiency, as illustrated in FIG. 11. Similarly in FIG. 12, a channel without interference in the secondary channel, Secondary 40 is not used, thus decreasing efficiency.

Figure 13:
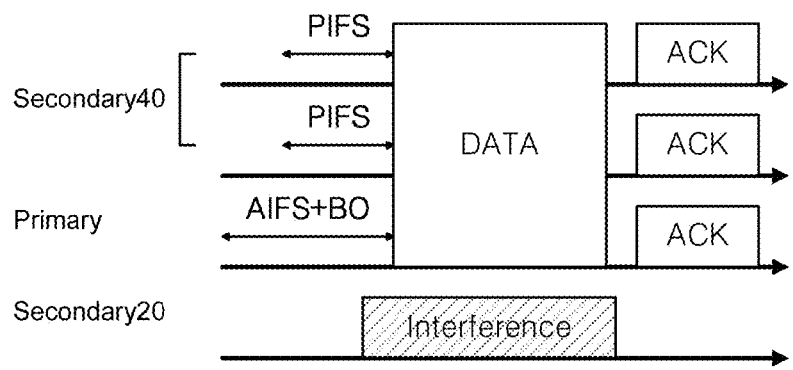
FIGS. 13 and 14 are views illustrating the concept of supporting a non-contiguous channel or a 60x MHz channel according to an embodiment of the present disclosure.
Figure 14:
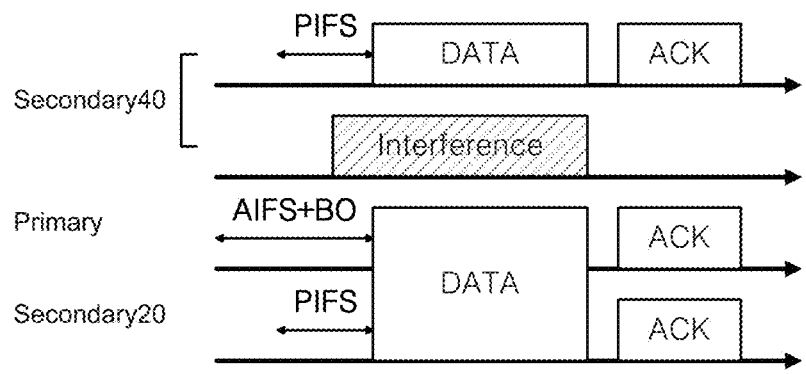

FIGS. 13 and 14 are views illustrating the concept of supporting a non-contiguous channel or a 60x MHz channel according to an embodiment of the present disclosure.

To solve the problem described with reference to FIGS. 11 and 12, a system which supports 60x MHz (x is a natural number) as illustrated in FIG. 13 or enables data transmission on a non-contiguous channel as illustrated in FIG. 14 is proposed in an embodiment of the present disclosure.

Specifically, FIG. 13 illustrates an example of configuring a 60-MHz channel with both the primary channel and the secondary channel, Secondary 40, except a busy channel part in the situation of FIG. 11. If a total bandwidth (BW) is 160 MHz, it is proposed that a channel of up to 120 (60×2) MHz is supported, compared to the legacy technology.

FIG. 14 illustrates a method for transmitting data on a non-contiguous channel except a channel with interference in the situation illustrated in the lower part of FIG. 12. That is, it is proposed that resources are used flexibly except only a channel unavailable due to interference or the like, compared to the legacy technology in which only a contiguous channel within a total BW is used.

In summary, the legacy system provides only brief information about 20, 40, 80, and 160 (or 80+80)-MHz units among contiguous BWs in a SIG field (BW field). However, an embodiment of the present disclosure proposes a method for indicating use of a 60x MHz contiguous BW or a non-contiguous band, as described above.

Figure 15:
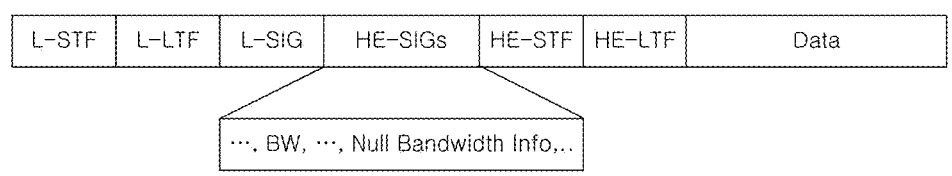
FIG. 15 is a view illustrating a resource allocation format to use a non-contiguous band or a 60x MHz band according to an embodiment of the present disclosure.

FIG. 15 is a view illustrating a resource allocation format to use a non-contiguous band or a 60x MHz band according to an embodiment of the present disclosure.

When transmitting a frame, an STA may include unused BW information, that is, null indication information (e.g., null BW/channel/subchannel information or non-contiguous BW/channel/subchannel information) in a HE-SIG field, as illustrated in FIG. 15. Preferably, the null indication information is included, only when the BW is 80 MHz or 160 (or 80+80) MHz.

In other words, it is proposed that the HE-SIG field includes BW information indicating whether a total BW is 20, 40, 80, or 160 (or 80+80) MHz, and null indication information indicating a channel area unused for data transmission in the total BW.

It is proposed that contiguous or non-contiguous used BW information is included in the HE-SIG field, instead of a null subchannel indication. The contiguous or non-contiguous used BW information may indicate an actually used BW or subchannel. A preferred unit may be 20 MHz or a multiple of 20 MHz (e.g., 40 MHz, 80 MHz, . . . ).

The above mentioned HE-SIG field is preferably HE-SIG A. However, the contiguous or non-contiguous BW information may be indicated by a common part of HE-SIG B, L-SIG preceding HE-SIG A, or by a phase rotation thereof.

Figure 16:
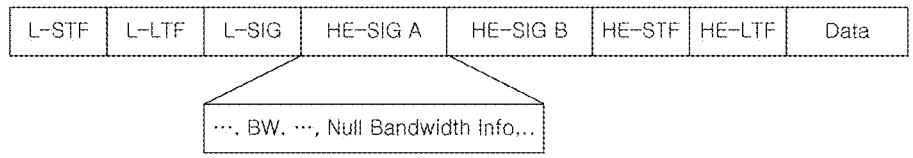
FIGS. 16 and 17 are views illustrating specific forms of the resource allocation format illustrated in FIG. 15.
Figure 17:
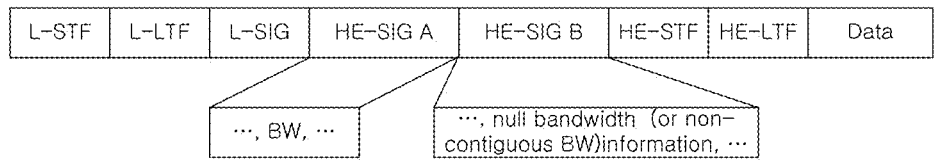

FIGS. 16 and 17 are views illustrating specific forms of the resource allocation format illustrated in FIG. 15.

As described before, an 11ax radio frame may include HE-SIG A and HE-SIG B as HE-SIG fields. In general, HE-SIG A may include common control information for a plurality of channels (users), and HE-SIG B may include information specific to each of the plurality of channels (or users). Further, HE-SIG B may be configured so that a predetermined part of HE-SIG B includes channel-common (user-common) information, and the remaining part of HE-SIG B includes channel-specific (user-specific) information.

If total BW information and null indication information are transmitted according to the foregoing embodiment, both the total BW information and the null indication information may be included in HE-SIG A, as illustrated in FIG. 16. Alternatively or additionally, as illustrated in FIG. 17, the total BW information may be included in HE-SIG A, and the null indication information may be included in HE-SIG B.

Now, a description will be given of a case in which a null indication is configured as a bitmap and a case in which a null indication is configured as an index indicating a channel combination, as specific examples of the foregoing embodiment.

Bitmap-Type Null Indication

Figure 18:
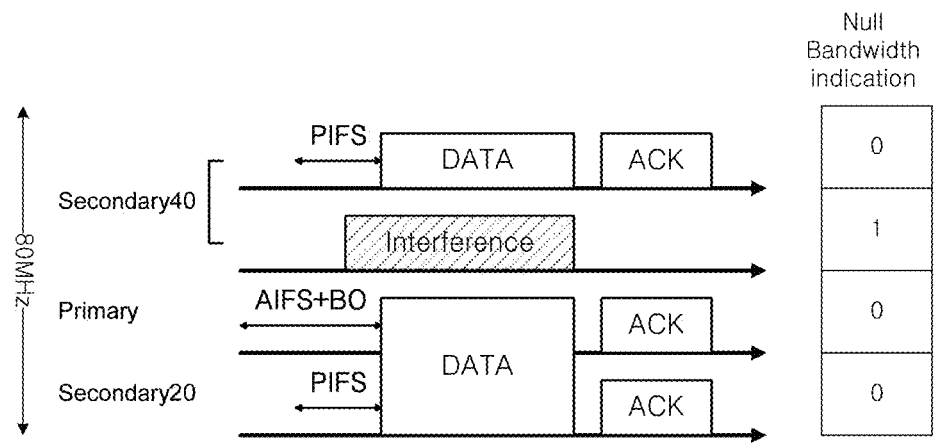
FIGS. 18 and 19 are exemplary views illustrating configuration of a null indication as a bitmap according to an embodiment of the present disclosure.
Figure 19:
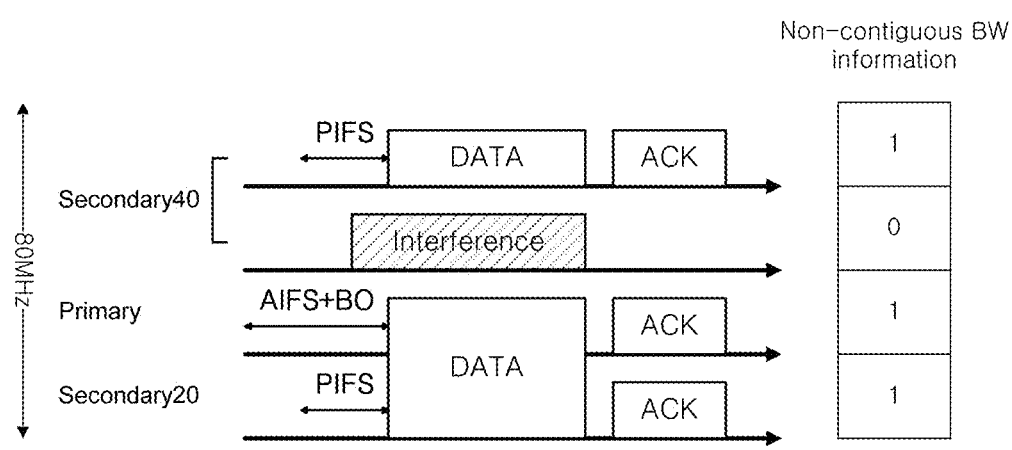

FIGS. 18 and 19 are exemplary views illustrating configuration of a null indication as a bitmap according to an embodiment of the present disclosure.

The null indication may be configured as a bitmap or an index, and included and transmitted in HE-SIG A or HE-SIG B, as described above. If the null indication is configured in the form of a bitmap, each bit of the bitmap may be mapped to a 20-MHz BW. In the bitmap, a bit set to 1 may indicate a non-allocated subband and a bit set to 0 may indicate an allocated subband in the example of FIG. 18. That is, a bitmap of 0100 may indicate that only the second 20-MHz channel is not used for data transmission, and the remaining first, third, and fourth 20-MHz channels are used for data transmission, among the 20-MHz channels in FIG. 18.

The bitmap may provide actually used BW information, instead of null BW information. Then, a bit is set to 1 to indicate an actually used channel and to 0 to indicate an unused channel in the bitmap. That is, although the null indication bitmap indicates null BWs, the bitmap may be configured to provide non-contiguous BW information. In other words, the bitmap may indicate BWs allocated for data transmission in FIG. 19, unlike FIG. 18. For example, the non-contiguous BW information may be represented as 1011 in the above example. FIG. 10 describes non-contiguous BW information, and although the term, null BW information is used for distinction, it may also be regarded as a kind of null indication.

For 80 MHz, the null indication may be configured as a 4-bit bitmap, whereas for 160 (or 80+80) MHz, the null indication may be configured as an 8-bit bitmap.

Figure 20:
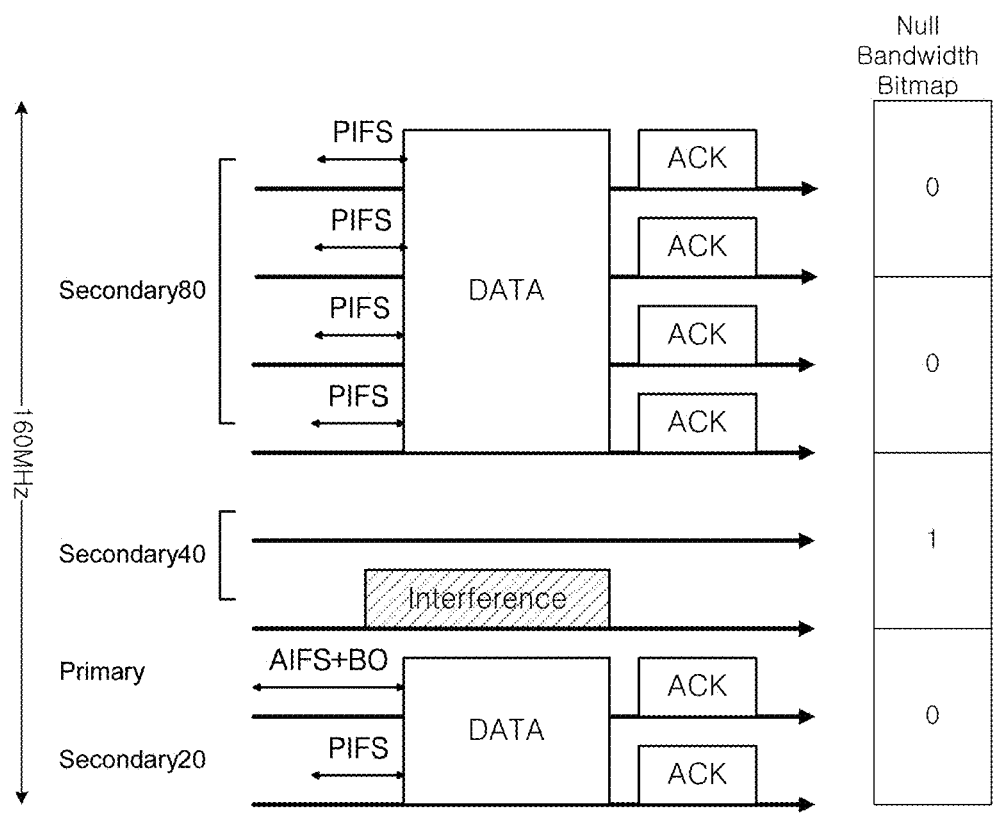
FIGS. 20 to 22 are views illustrating a resource allocation method for a total bandwidth of 160 MHz according to an embodiment of the present disclosure.
Figure 21:
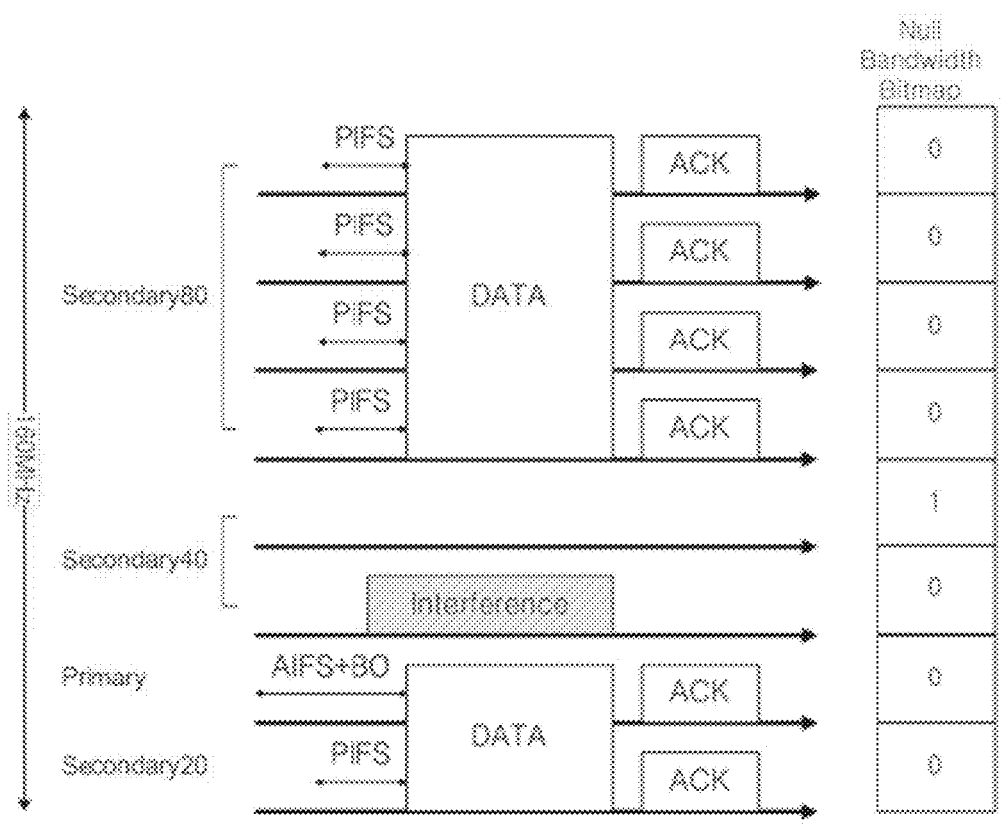
Figure 22:
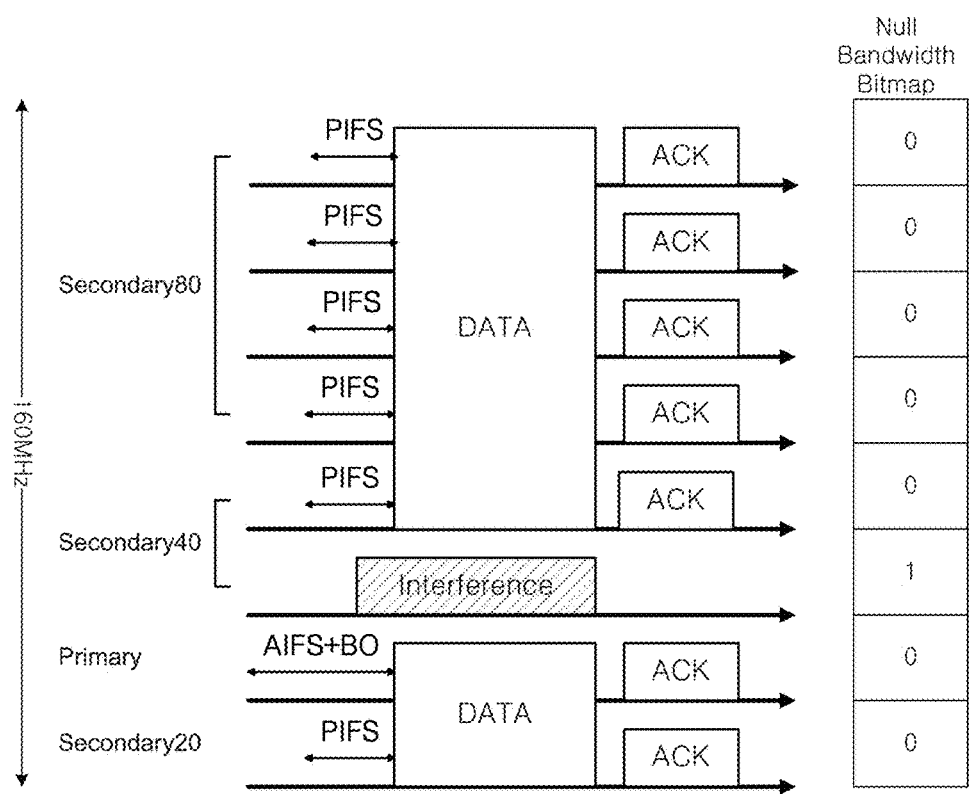

FIGS. 20 to 22 are views illustrating a resource allocation method for a total BW of 160 MHz according to an embodiment of the present disclosure.

For 160 (or 80+80) MHz, null BWs may be indicated on a 40-MHz basis, as illustrated in FIG. 20. In this case, a 4-bit bitmap may be configured for 160 MHz, as for 80 MHz.

In the above case, however, a partial band of a secondary channel, Secondary 40 may not be used, as illustrated in FIG. 20.

FIG. 21 illustrates an example of indicating null BWs on a 20-MHz basis for 160 (or 80+80) MHz.

If all or part of the secondary channel, Secondary 40 has interference, none of the secondary channel, Secondary 40 is not used in the above example.

Unlike FIG. 21, if part of the secondary channel, Secondary 40 is used, a null BW bitmap may be configured as 00000100 in FIG. 22.

If the concept of primary channels is used as in 11ac, the bitmap may be configured with the remaining bits except bits corresponding to primary channels. For example, the bitmap is configured in 3 bits for 80 MHz, each bit indicates whether a secondary channel corresponding to the bit is included. [Table 1] below lists exemplary bitmaps configured for the secondary channels except the primary channels.

TABLE 1

Bandwidth index bitmap
000: 20 MHz (primary)
100: 40 MHz (Contiguous, Primary + Secondary 20)
010: 40 MHz (Contiguous, Primary + 1$^{st}$ sub-CH of Seondary 40)
001: 40 MHz (Non-contiguous, Primary + 2$^{nd}$ sub-CH of Secondary 40)
110: 60 MHz (Contiguous, Primary + Secondary 20 + 1$^{st}$ sub-CH of Secondary 40)
011: 60 MHz (Contiguous, Primary + Secondary 40)
101: 60 MHz (Non-contiguous, Primary + Secondary 20 + 2$^{nd}$ sub-CH of Secondary 40)
111: 80 MHz (Contiguous)

A similar bitmap may be configured for 160 (or 80+80) MHz. That is, a 7-bit bitmap may correspond to respective secondary channels, Secondary 20, Secondary 40, and Secondary 80, and may indicate which secondary channel is used along with a primary channel, as follows.

TABLE 2

0000000: 20 MHz (primary)
1000000: 40 MHz (Contiguous, Primary + Secondary 20)
0100000: 40 MHz (Contiguous, Primary + 1$^{st}$ sub-CH of Seondary 40)
0010000: 40 MHz (Non-contiguous, Primary + 2$^{nd}$ sub-CH of Secondary 40)
1100000: 60 MHz (Contiguous, Primary + Secondary 20 + 1$^{st}$ sub-CH of Secondary 40)
0110000: 60 MHz (Contiguous, Primary + Secondary 40)
1010000: 60 MHz (Non-contiguous, Primary + Secondary 20 + 2$^{nd}$ sub-CH of Secondary 40)
1110000: 80 MHz (Contiguous)
. . .
1111111: 160 MHz or (80 + 80) MHz 3 bits may be used to indicate BW indexes, and additional information about contiguous/non-contiguous channels may be represented as follows, inclusive of legacy BW information (20/40/80/160 MHz).

TABLE 3

Bandwidth index (3 bits)

0: 20 MHz (primary)
1: 40 MHz (Contiguous, Primary + Secondary 20)
2: 40 MHz (Contiguous, Primary + $1^{st}$ sub-CH of Seondary 40)
3: 40 MHz (Non-contiguous, Primary + $2^{nd}$ sub-CH of Secondary 40)
4: 60 MHz (Contiguous, Primary + Secondary 20 + $1^{st}$ sub-CH of Secondary 40)
5: 60 MHz (Contiguous, Primary + Secondary 40)
6: 80 MHz (Contiguous)
7: 160 MHz or 80 + 80 MHz In the above example, 60 MHz non-contiguous is omitted. Instead, the legacy 160 MHz or 80+80 MHz is included.

If 60 MHz non-contiguous is not omitted, the following table may be configured.

TABLE 4

Bandwidth index (4 bits)

0: 20 MHz (primary)
1: 40 MHz (Contiguous, Primary + Secondary 20)
2: 40 MHz (Contiguous, Primary + $1^{st}$ sub-CH of Seondary 40)
3: 40 MHz (Non-contiguous, Primary + $2^{nd}$ sub-CH of Secondary 40)
4: 60 MHz (Contiguous, Primary + Secondary 20 + $1^{st}$ sub-CH of Secondary 40)
5: 60 MHz (Contiguous, Primary + Secondary 40)
6: 60 MHz (Non-contiguous, Primary + Secondary 20 + $2^{nd}$ sub-CH of Secodnary 40)
7: 80 MHz (Contiguous)
8: 160 MHz or 80 + 80 MHz
9-15: Reserved The representations of the secondary channels in [Table 1] may be changed as follows.

TABLE 5

Bandwidth index (3 bits)

0: 20 MHz (primary)
1: 40 MHz (Primary CH + $1^{st}$ Secondary CH)
2: 40 MHz (Primary CH + $2^{nd}$ Secondary CH)
3: 40 MHz (Primary CH + $3^{rd}$ Secondary CH)
4: 60 MHz (Primary CH + $1^{st}$ Secondary CH + $2^{nd}$ Secondary CH)
5: 60 MHz (Primary CH + $2^{nd}$ Secondary CH + $3^{rd}$ Secondary CH)
6: 60 MHz (Primary CH + $1^{st}$ Secondary CH + $3^{rd}$ Secondary CH)
7: 80 MHz (Contiguous)

The representations of the secondary channels in [Table 3] may be changed as follows.

TABLE 6

Bandwidth index (3 bits)

0: 20 MHz (primary)
1: 40 MHz (Primary CH + $1^{st}$ Secondary CH)
2: 40 MHz (Primary CH + $2^{nd}$ Secondary CH)
3: 40 MHz (Primary CH + $3^{rd}$ Secondary CH)
4: 60 MHz (Primary CH + $1^{st}$ Secondary CH + $2^{nd}$ Secondary CH)
5: 60 MHz (Primary CH + $2^{nd}$ Secondary CH + $3^{rd}$ Secondary CH)
6: 80 MHz
7: 160 MHz or 80 + 80 MHz The representations of the secondary channels in [Table 3] may also be changed as follows.

TABLE 7

Bandwidth index (4 bits)

0: 20 MHz (primary)
1: 40 MHz (Primary CH + $1^{st}$ Secondary CH)
2: 40 MHz (Primary CH + $2^{nd}$ Secondary CH)
3: 40 MHz (Primary CH + $3^{rd}$ Secondary CH)
4: 60 MHz (Primary CH + $1^{st}$ Secondary CH + $2^{nd}$ Secondary CH)
5: 60 MHz (Primary CH + $2^{nd}$ Secondary CH + $3^{rd}$ Secondary CH)
6: 60 MHz (Primary CH + $1^{st}$ Secondary CH + $3^{rd}$ Secondary CH)
7: 80 MHz (Contiguous)
8: 160 MHz or 80 + 80 MHz
9-15: Reserved Meanwhile, if no null BW is included in 80 MHz or 160 MHz, null BW information may be unnecessary. Therefore, null BW information may be optionally included by means of an indication indicating whether the null BW information is included in an embodiment of the present disclosure. That is, only if Null BW Presence is set to 1, null BW information (e.g., bitmap) may be included in a HE-SIG field.

Figure 23:
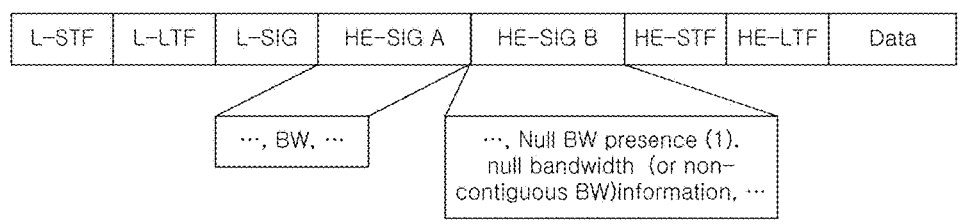
FIG. 23 is an exemplary view illustrating a Null Bandwidth (BW) Presence field according to an embodiment of the present disclosure.

FIG. 23 is an exemplary view illustrating a Null BW Presence field according to an embodiment of the present disclosure.

If a BW field is included in HE-SIG A and the BW is 80 or 160 MHz, null BW information may be included and transmitted in HE-SIG B, as illustrated in FIG. 22. As illustrated in FIG. 22, if Null BW Presence is included, the null BW information may or may not be included according to the value of Null BW Presence.

Index-Type Null Indication

As described before, a null BW bitmap is an example of null subband information. The null subband information may be indicated by a form other than a null BW bitmap.

The following table is an example of indicating null subband information in 80 MHz by an index.

TABLE 8

| Index | P-CH | 1st S-CH | 2nd S-CH | 3rd S-CH | Notes |
|---|---|---|---|---|---|
| 1 | o | o | o | x | 60 MHz |
| 2 | o | o | x | o | |
| 3 | o | x | o | o | |
| 4 | o | x | o | x | Non-contiguous 40 MHz |
| 5 | o | x | x | o | |

In the example of [Table 8], o indicates allocation of a band, and x indicates non-allocation of a band.

Index 1 indicates a contiguous 60-MHz channel including a primary channel. Indexes 2 and 3 indicate non-contiguous 60-MHz BWs, and Indexes 4 and 5 indicate non-contiguous 40-MHz BWs.

The following table illustrates another example. A column representing the primary channel is interposed between columns representing the secondary channels, Secondary 20 and Secondary 40.

TABLE 9

| Index | Secondary 20 | Primary CH | Secondary 40 | Secondary 40 | Notes |
|---|---|---|---|---|---|
| 1 | o | o | o | x | 60 MHz |
| 2 | o | o | x | o | |

TABLE 9-continued

| Index | Secondary 20 | Primary CH | Secondary 40 | Secondary 40 | Notes |
|---|---|---|---|---|---|
| 3 | x | ○ | ○ | ○ | |
| 4 | x | ○ | ○ | x | Non-contiguous 40 MHz |
| 5 | x | ○ | x | ○ | |

A frame may be transmitted without including a primary channel, and the following table illustrates an example including cases of not using the primary channel.

TABLE 10

| Index | P-CH | 1st S-CH | 2nd S-CH | 3rd S-CH | Notes |
|---|---|---|---|---|---|
| 1 | ○ | ○ | ○ | x | 60 MHz |
| 2 | ○ | ○ | x | ○ | |
| 3 | ○ | x | ○ | ○ | |
| 4 | x | ○ | ○ | ○ | |
| 5 | ○ | x | ○ | x | 40 MHz |
| 6 | ○ | x | x | ○ | |
| 7 | x | ○ | ○ | x | |
| 8 | x | ○ | x | ○ | |
| 9 | x | x | ○ | ○ | |
| 10 | x | ○ | x | x | 20 MHz |
| 11 | x | x | ○ | x | |
| 12 | x | x | x | ○ | |

Similar indexes may be defined for 160 MHz. The following table illustrates an example of indicating null BWs on a 40-MHz basis, for 160 MHz.

TABLE 11

| Index | P-CH, 1st S-CH | 2nd & 3rd S-CH | 4th & 5th S-CH | 6th & 7th S-CH | Notes |
|---|---|---|---|---|---|
| 1 | ○ | ○ | ○ | x | 120 MHz |
| 2 | ○ | ○ | x | ○ | |
| 3 | ○ | x | ○ | ○ | |
| 4 | ○ | x | ○ | x | Non-contiguous 80 MHz |
| 5 | ○ | x | x | ○ | |

A frame may be transmitted without including a primary channel, and the following table illustrates an example including cases of not using the primary channel.

TABLE 12

| Index | P-CH, 1st S-CH | 2nd & 3rd S-CH | 4th & 5th S-CH | 6th & 7th S-CH | Notes |
|---|---|---|---|---|---|
| 1 | ○ | ○ | ○ | x | 120 MHz |
| 2 | ○ | ○ | x | ○ | |
| 3 | ○ | x | ○ | ○ | |
| 4 | x | ○ | ○ | ○ | |
| 5 | ○ | x | ○ | x | 80 MHz |
| 6 | ○ | x | x | ○ | |
| 7 | x | ○ | ○ | x | |
| 8 | x | ○ | x | ○ | |
| 9 | x | x | ○ | ○ | |
| 10 | x | ○ | x | x | 40 MHz |
| 11 | x | x | ○ | x | |
| 12 | x | x | x | ○ | |

The following table illustrates an example of indicating BW allocation information on a 20-MHz basis, for 160 MHz.

TABLE 13

| Index | P-CH, | 1st S-CH | 2nd S-CH | 3rd S-CH | 4th S-CH | 5th S-CH | 6th S-CH | 7th S-CH | Notes |
|---|---|---|---|---|---|---|---|---|---|
| 1 | ○ | ○ | ○ | ○ | ○ | ○ | ○ | x | 140 |
| 2 | ○ | ○ | ○ | ○ | ○ | ○ | x | ○ | |
| 3 | ○ | ○ | ○ | ○ | ○ | x | ○ | ○ | |
| 4 | ○ | ○ | ○ | ○ | x | ○ | ○ | ○ | |
| 5 | ○ | ○ | ○ | x | ○ | ○ | ○ | ○ | |
| 6 | ○ | ○ | x | ○ | ○ | ○ | ○ | x | |
| 7 | ○ | x | ○ | ○ | ○ | ○ | ○ | ○ | |
| 8 | ○ | ○ | ○ | ○ | ○ | ○ | x | x | 120 |
| 9 | ○ | ○ | ○ | ○ | ○ | x | ○ | x | |
| 10 | ○ | ○ | ○ | ○ | x | ○ | ○ | x | |
| 11 | ○ | ○ | ○ | x | ○ | ○ | ○ | x | |
| 12 | ○ | ○ | x | ○ | ○ | ○ | ○ | x | |
| 13 | ○ | x | ○ | ○ | ○ | ○ | ○ | x | |
| 14 | ○ | ○ | ○ | ○ | ○ | x | x | x | 100 MHz |
| 15 | ○ | ○ | ○ | ○ | x | ○ | x | x | |
| 16 | ○ | ○ | ○ | x | ○ | ○ | x | x | |
| 17 | ○ | ○ | x | ○ | ○ | ○ | x | x | |
| ... | ... | ... | ... | ... | ... | ... | ... | ... | ... |

Null subband information (non-contiguous BW information) may be used along with legacy BW indexes.

TABLE 14

| BW Index | |
|---|---|
| 1 | 20 MHz |
| 2 | 40 MHz |
| 3 | 80 MHz |
| 4 | 160 or (80 + 80) MHz |

| | P-CH | 1st S-CH | 2nd S-CH | 3rd S-CH | Notes |
|---|---|---|---|---|---|
| 5 | ○ | ○ | ○ | x | 60 MHz |
| 6 | ○ | ○ | x | ○ | |
| 7 | ○ | x | ○ | ○ | |
| 8 | ○ | x | ○ | x | 40 MHz |
| 9 | ○ | x | x | ○ | |

| | P-CH, 1st S-CH | 2nd & 3rd S-CH | 4th & 5th S-CH | 6th & 7th S-CH | Notes |
|---|---|---|---|---|---|
| 10 | ○ | ○ | ○ | x | 120 MHz |
| 11 | ○ | ○ | x | ○ | |
| 12 | ○ | x | ○ | ○ | |
| 13 | ○ | x | ○ | x | 80 MHz |
| 14 | ○ | x | x | ○ | |

In the above example, BW information indicates inclusion of the primary channel all the time. In 160 MHz, a subband unit is 40 MHz. Various combinations may be produced from these indexes.

Primary channel included & basic subband unit=40 MHz in 160 MHz→indexes are configured as illustrated in [Table 10].

Primary channel included & basic subband unit=20 MHz in 160 MHz

Primary channel not included & basic subband unit=40 MHz in 160 MHz

Primary channel not included & basic subband unit=20 MHz in 160 MHz

In the above example, subband use/non-use information (e.g., null BW information/non-contiguous subband information, or non-allocated subband indication information) is provided for each 20-MHz unit in 80 MHz, and each 40-MHz or 20-MHz unit in 160 MHz. The unit may be referred to as a different term or form corresponding to the same size.

[Table 15] below describes an exemplary time-frequency frame structure in an 11ax system.

TABLE 15

<Example of time-frequency frame structure in 11ax>

FFT size (4-times extension from existing WiFi numerology): 256FFT for 20 MHz, 512FFT for 40 MHz, 1024FFT for 80 MHz, 2048FFT for contiguous 160 MHz or each 1024FFT for non-contiguous 160 MHz BW
Subcarrier spacing: 78.125 kHz (¼ of existing WiFi numerology)
IDFT/DFT length: 3.2 μs * 4 = 12.8 μs
OFDM symbol length: IDFT/DFT length + GI In the above 11ax frame structure, one basic resource unit with 242 tones may be configured in 20 MHz, two 242-tone basic resource units in 40 MHz, and four 242-tone basic resource units in 80 MHz. In representation, thus, a 242-tone resource unit may be equivalent to 20 MHz, and two contiguous resource units may be equivalent to 40 MHz (242-tone resource unit×2=40 MHz). Then, the afore-defined subband use/non-use indication information is still viable. For example, if the subband use/non-use indication information is configured as a bitmap, a 4-bit bitmap is configured for 80 MHz. If a basic null resource unit is 40 MHz (242-tone resource unit×2) for 140 MHz, a 4-bit bitmap is configured. If a basic null resource unit is 20 MHz (a 242-tone resource unit) for 140 MHz, a 16-bit bitmap is configured. Indexes are also defined in the afore-described manners.

[Table 16] below describes another exemplary non-contiguous BW information format.

TABLE 16

Bandwidth index (4 bits, B4B3B2B1)
    MSB 1 bit (b4): indicates whether the BW is 80MHz.
    If (b4==1) {//indicates 80 MHz
        B3b2b1: each bit is mapped to a secondary channel. B3 is mapped to the first
secondary channel, B2 is mapped to the second secondary channel, and B1 is mapped to the
third secondary channel. For example, 010 indicates use of the primary channel and a
secondary channel.
    } else {//b4==0, indicates a BW other than 80MHz.
        B3B2B1 // (primary channel included)
        000: 20MHz BW
        001: 40MHz BW
        010: 160MHz BW or 80+80MHz BW
        011 to 111: reserved

[Table 17] below describes an example of supporting partial contiguous or non-contiguous channel bonding in 160 MHz, using the reserved bits.

TABLE 17

Bandwidth index (4 bits, B4B3B2B1)
    MSB 1 bit (b4): indicates whether the BW is 80MHz.
    If (b4==1) {//indicates 80MHz
        B3b2b1: each bit is mapped to a secondary channel. B3 is mapped to the first
secondary channel (e.g., secondary 20), B2 is mapped to the second secondary channel (e.g.,
$1^{st}$ 20 of Secondary 40), and B1 is mapped to the third secondary channel (e.g., $2^{nd}$ 20 of
Secondary 40). Obviously, the mapping sequence may be changed. For example, 010
indicates use of the primary channel and the second secondary channel.
    } else {//b4==0, indicates a BW other than 80MHz. A BW equal to or larger that 80MHz
is a BW including primary 80.
        B3B2B1 // (primary channel included)
        000: 20MHz BW
        001: 40MHz BW
        010: 160MHz BW or 80+80MHz BW
        011: 100MHz (Contiguous, Primary 80 + $1^{st}$ secondary CH of secondary 80)
        100: 120MHz (Contiguous, Primary 80 + $1^{st}$ and $2^{nd}$ secondary CHs of secondary 80)
        101: 120MHz (Non-contiguous, Primary 80 + $3^{rd}$ and $4^{th}$ secondary CHs of
secondary 80)
        110: 140MHz (Contiguous, Primary 80 + $1^{st}$, $2^{nd}$, and $3^{rd}$ secondary CHs of
secondary 80)
        111: 140MHz (Non-contiguous, Primary 80 + $1^{st}$, $3^{rd}$ and $4^{th}$ secondary CHs of
secondary 80)
    }

Non-contiguous BW information may be included and transmitted in L-SIG. In this case, a combining gain may be achieved from HE-SIG A.

TABLE 18

Bandwidth index (4 bits, B4B3B2B1)
   MSB 1 bit (b4): represents information about a BW and subchannels equal to or smaller than 80MHz.
   If (b4==1) {//contiguous/non-contiguous BWs <= 80MHz
      B3b2b1: each bit is mapped to a secondary channel. B3 is mapped to the first secondary channel (e.g., Secondary 20), B2 is mapped to the second secondary channel (e.g., $1^{st}$ 20 of Secondary 40), and B1 is mapped to the third secondary channel (e.g., $2^{nd}$ 20 of Secondary 40). Obviously, the mapping sequence may be changed. For example, 010 indicates use of the primary channel and the second secondary channel.
   } else {//b4==0, indicates a BW other than 80MHz, contiguous/non-contiguous BWs > 80MHz. A BW equal to or larger that 80MHz is a BW including primary 80.
      B3B2B1 // (primary channel included)
      000: 160MHz BW or 80+80MHz BW
      001: 100MHz (Contiguous, Primary 80 + $1^{st}$ secondary CH of secondary 80)
      010: 120MHz (Contiguous, Primary 80 + $1^{st}$ and $2^{nd}$ secondary CHs of secondary 80)
      011: 120MHz (Non-contiguous, Primary 80 + $3^{rd}$ and $4^{th}$ secondary CHs of secondary 80)
      100: 120MHz (Non-contiguous, Primary 80 + $2^{nd}$ and $3^{rd}$ secondary CHs of secondary 80)
      101: 140MHz (Contiguous, Primary 80 + $1^{st}$, $2^{nd}$, and $3^{rd}$ secondary CHs of secondary 80)
      110: 140MHz (Contiguous, Primary 80 + $1^{st}$, $2^{nd}$, and $4^{th}$ secondary CHs of secondary 80)
      111: 140MHz (Non-contiguous, Primary 80 + $1^{st}$, $3^{rd}$ and $4^{th}$ secondary CHs of secondary 80)
   }

Other BW combinations for a BW equal to or larger than 80 MHz are also available.

Figure 24:
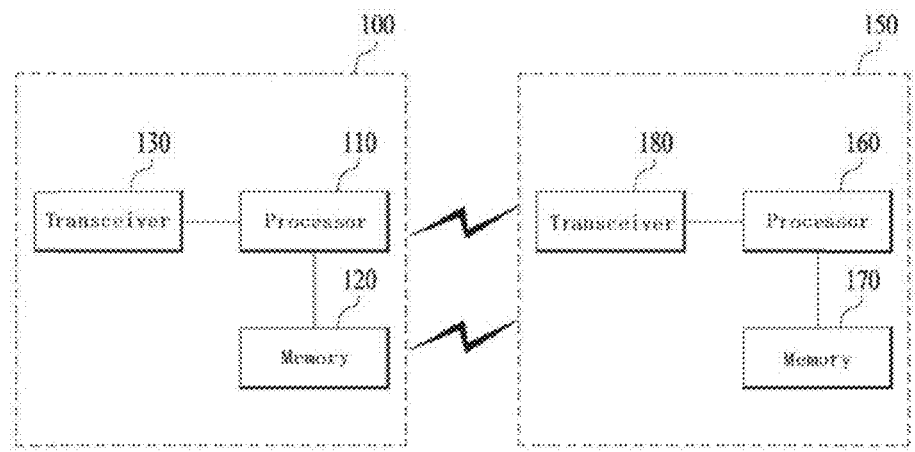
FIG. 24 is a block diagram illustrating exemplary configurations of an Access Point (AP) (or Base Station (BS)) and a Station (STA) (or User Equipment (UE)).

FIG. 24 is a block diagram illustrating an exemplary configuration of an AP (or a BS) and an STA (or a terminal) according to an embodiment of the present invention.

The AP 100 may include a processor 110, a memory 120, and a transceiver 130. The STA 150 may include a processor 160, a memory 170, and a transceiver 180.

The transceivers 130 and 180 may transmit/receive radio signals and may implement a physical layer according to, for example, an IEEE 802 system. The processors 110 and 160 may be connected to the transceivers 130 and 180 to implement a physical layer and/or a MAC layer according to the IEEE 802 system. The processors 110 and 160 may be configured to perform operations in accordance with one or more combinations of the various embodiments of the invention described above. In addition, modules implementing the operations of the AP and the STA according to the various embodiments of the present invention described above may be stored in the memories 120 and 170 and executed by the processors 110 and 160. The memories 120 and 170 may be included in the processors 110 and 160 or may be installed outside the processors 110 and 160 and connected to the processors 110 and 160 by known means.

The above description of the AP 100 and the STA 150 may be applied to a BS and a terminal in other wireless communication systems (e.g., LTE/LTE-A system), respectively.

The specific configuration of the AP and the STA may be implemented such that the above-described embodiments of the present invention are applied independently or two or more of the embodiments are applied at the same time. For the sake of clarity, redundant description will be omitted.

Figure 25:
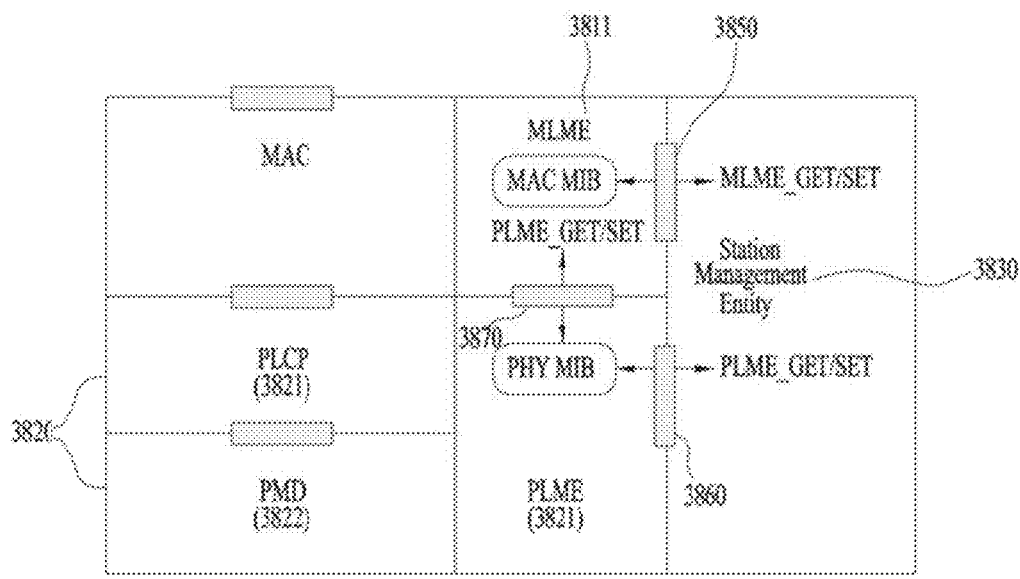
FIG. 25 is a view illustrating an exemplary structure of a processor in an AP or an STA.

FIG. 25 illustrates an exemplary structure of a processor of an AP or an STA according to an embodiment of the present invention.

The processor of the AP or STA may have a plurality of layers, and FIG. 25 specifically illustrates a MAC sublayer 3810 and a physical layer 3820 on a data link layer (DLL) among these layers. As shown in FIG. 25, the PHY 3820 may include a Physical Layer Convergence Procedure (PLCP) entity 3821 and a Physical Medium Dependent (PMD) entity 3822. The MAC sublayer 3810 and the PHY 3820 both conceptually include a management entity called an MLME (MAC Sublayer Management Entity) 3811. These entities 3811 and 3821 provide a layer management service interface in which the layer management function operates.

In order to provide correct MAC operation, an STA Management Entity (SME) 3830 exists in each STA. The SME 3830 is a layer-independent entity that may be present in a separate management plane or may appear to be off to the side. Although the exact functions of the SME 3830 are not specifically described in this document, the entity 3830 may generally appear to serve to collect layer-dependent states from various Layer Management Entities (LMEs) and set layer-specific parameter values similarly. The SME 3830 may typically perform these functions on behalf of the typical system management entity and implement a standard management protocol.

The entities shown in FIG. 25 interact in various ways. FIG. 25 shows some examples of exchanging GET/SET primitives. The XX-GET.request primitive is used to request the value of a given MIB attribute (management information based attribute). The XX-GET.confirm primitive returns an appropriate value of the MIB attribute information if the Status is "Success". Otherwise, it is used to return an error indication in the Status field. The XX-SET.request primitive is used to request that the indicated MIB attribute be set to a given value. If the MIB attribute indicates a specific operation, it is requested that the corresponding operation be performed. The XX-SET.confirm primitive confirms that the indicated MIB attribute is set to a requested value if the status is "Success". Otherwise, it is used to return an error condition to the status field. If the MIB attribute indicates a specific operation, this confirms that the operation has been performed.

As shown in FIG. 25, the MLME 3811 and SME 3830 may exchange various MLME_GET/SET primitives through MLME_SAP 3850. In addition, various PLC- M_GET/SET primitives may be exchanged between the PLME 3821 and the SME 3830 via the PLME_SAP 3860 and may be exchanged between the MLME 3811 and the PLME 3870 via the MLME-PLME_SAP 3870.

The embodiments of the present invention described above may be implemented through various means. For example, the embodiments of the present invention may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. Thus, the present invention is not intended to be limited to the embodiments described herein, but is intended to have the widest scope consistent with the principles and novel features disclosed herein. While the present invention has been particularly shown and described with reference to preferred embodiments thereof, it will be apparent to those skilled in the art that various modifications and variations can be made in the present invention without departing from the spirit or scope of the invention. Such modifications are not to be construed individually from the spirit and scope of the present disclosure.

In this specification, both an article invention and a method invention are explained, and the description of the two inventions may be supplemented as necessary.

What is claimed is:

1. A method for a station (STA) to transmit a frame in a wireless local area network (WLAN) system, the method comprising:
   configuring the frame comprising a signaling (SIG) field for control information and a data field for data transmission, wherein the control information of the SIG field includes a bandwidth field used for determining a total bandwidth as one of $2^n$ unit channels, wherein 'n' is an integer equal to or greater than 0; and
   transmitting the frame to another STA,
   wherein the bandwidth field is further used for determining a null channel within the total bandwidth,
   wherein the bandwidth field has a value selected from a first range or a second range,
   wherein each of values within the first range is for representing the total bandwidth as one of the $2^n$ unit channels, and
   wherein each of values within the second range is for representing size and location of the null channel.

2. The method of claim 1, wherein the data field of the frame includes a bandwidth for data transmission other than 20 MHz, 40 MHz, 80 MHz and 160 MHz.

3. The method of claim 1, wherein the SIG field comprises a first SIG (SIG A) field and a second SIG (SIG B) field,
   wherein the bandwidth field is included in the SIG A field, and
   wherein the second SIG field represents whether each of the $2^n$ unit channels within the total bandwidth is the null channel or not.

4. The method of claim 1, wherein one unit channel has a bandwidth of 20 MHz, and
   wherein the bandwidth field indicates the null channel only when the total bandwidth equal to or greater than 80 MHz.

5. The method of claim 1, wherein the bandwidth field has a length longer than 2 bits,
   wherein a 1st to 4th values represented by the bandwidth field respectively indicates the total bandwidth as one of 20 MHz, 40 MHz, 80 MHz and 160 MHz, and
   wherein, from a 5th value of the bandwidth field, the bandwidth field indicates the size and the location of the null channel.

6. The method of claim 1, wherein there are a primary 20 MHz channel and a secondary 20 MHz channel within the total bandwidth, when the total bandwidth is equal to or greater than 40 MHz,
   wherein the primary 20 MHz channel is not configured as a null unit channel.

7. The method of claim 1, wherein the frame is a multi-user frame.

8. The method of claim 2, wherein the values within the second range includes:
   values in a third range representing the bandwidth for data transmission is 60 MHz, and
   values in a fourth range representing the bandwidth for data transmission is 120 MHz.

9. The method of claim 8, wherein the values in the third range include one or more values representing one of secondary 20 MHz channels within 80 MHz is the null channel, and
   wherein the values in the fourth range include one or more values representing one of 40 MHz channels within 160 MHz is the null channel.

10. A station (STA) for transmitting a frame in a wireless local area network (WLAN) system, the station comprising:
    a processor configured to generate the frame comprising a signaling (SIG) field for control information and a data field for data transmission, wherein the control information of the SIG field includes a bandwidth field used for determining a total bandwidth corresponding to one of $2^n$ unit channels, wherein 'n' is an integer equal to or greater than 0; and
    a transceiver configured to transmit the frame to a second STA,
    wherein the processor configures the bandwidth field to be used for determining a null channel within the total bandwidth,
    wherein the bandwidth field has a value selected from a first range or a second range,
    wherein each of values within the first range is for representing the total bandwidth as one of the $2^n$ unit channels, and
    wherein each of values within the second range is for representing size and location of the null channel.

11. The station of claim 10, wherein the processor is capable of configuring the data field of the frame to have a bandwidth for data transmission other than 20 MHz, 40 MHz, 80 MHz and 160 MHz.

12. The station of claim 10, wherein the SIG field comprises a first SIG (SIG A) field and a second SIG (SIG B) field,
   wherein the processor includes the bandwidth field in the SIG A field, and
   wherein the processor indicates whether each of the $2^n$ unit channels within the total bandwidth is the null channel or not based on the SIG B field.

13. The station of claim 10, wherein the bandwidth field has a length longer than 2 bits,
   wherein a 1st to 4th values represented by the bandwidth field respectively indicates the total bandwidth as one of 20 MHz, 40 MHz, 80 MHz and 160 MHz, and
   wherein, from a 5th value of the bandwidth field, the bandwidth field indicates the size and the location of the null channel.

14. The station of claim 11, wherein the values within the second range includes:
   values in a third range representing the bandwidth for data transmission is 60 MHz, and
   values in a fourth range representing the bandwidth for data transmission is 120 MHz.

15. The station of claim 14, wherein the values in the third range include one or more values representing one of secondary 20 MHz channels within 80 MHz is the null channel, and
   wherein the values in the fourth range include one or more values representing one of 40 MHz channels within 160 MHz is the null channel.

* * * * *